(12) United States Patent
Sahara

(10) Patent No.: US 11,669,036 B2
(45) Date of Patent: Jun. 6, 2023

(54) PRINTING APPARATUS AND METHOD OF CONTROLLING THE SAME

(71) Applicant: CANON KABUSHIKI KAISHA, Tokyo (JP)

(72) Inventor: Akiyoshi Sahara, Chiba (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/689,161

(22) Filed: Mar. 8, 2022

(65) Prior Publication Data
US 2022/0291619 A1 Sep. 15, 2022

(30) Foreign Application Priority Data
Mar. 12, 2021 (JP) .............................. JP2021-040694

(51) Int. Cl.
| | |
|---|---|
| G03G 15/00 | (2006.01) |
| G03G 21/00 | (2006.01) |
| G03G 21/16 | (2006.01) |
| G03G 21/18 | (2006.01) |
| G06F 3/12 | (2006.01) |

(52) U.S. Cl.
CPC ....... *G03G 15/556* (2013.01); *G03G 15/5079* (2013.01); *G03G 21/1647* (2013.01); *G03G 21/1676* (2013.01); *G03G 21/1892* (2013.01); *G06F 3/121* (2013.01)

(58) Field of Classification Search
CPC ........... G03G 15/0863; G03G 15/5075; G03G 15/5079; G03G 15/556; G03G 21/1647; G03G 21/1676; G03G 21/1892; G06F 3/12; G06F 3/121
See application file for complete search history.

(56) References Cited

U.S. PATENT DOCUMENTS

| | | |
|---|---|---|
| 9,636,931 B2 | 5/2017 | Sahara et al. |
| 2014/0023382 A1* | 1/2014 | Kawana ............ G03G 15/5079 399/8 |
| 2018/0041647 A1* | 2/2018 | Sakamoto ............... G06F 3/121 |
| 2018/0314482 A1* | 11/2018 | Ishida .................... G06F 3/1222 |
| 2019/0101864 A1* | 4/2019 | Nagasaki ........... G03G 15/5079 |

FOREIGN PATENT DOCUMENTS

JP 2018-017940 A 2/2018

* cited by examiner

*Primary Examiner* — Sophia S Chen
(74) *Attorney, Agent, or Firm* — Venable LLP

(57) ABSTRACT

A printing apparatus is provided. A mount unit is able to mount a consumable. A communication unit is able to communicate with a server system. A request unit requests, to the server system via the communication unit, service-related information related to the consumable. A reception unit receives, via the communication unit, the service-related information transmitted from the server system with respect to the request. A determination unit determines, in a case in which a state of the communication unit has shifted from a first state in which communication with the server system is disabled to a second state in which communication with the server system is enabled, whether a request for the service-related information by the request unit is required, based on a reception history of the service-related information of the reception unit.

20 Claims, 9 Drawing Sheets

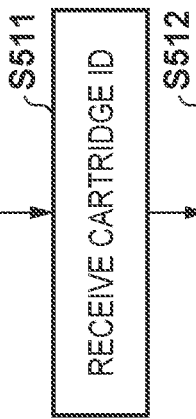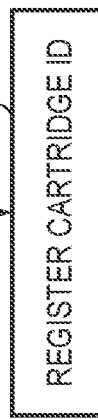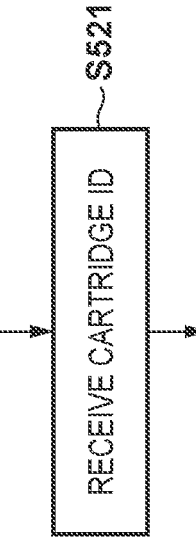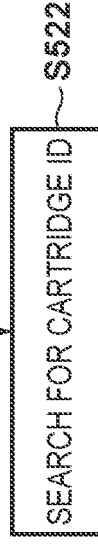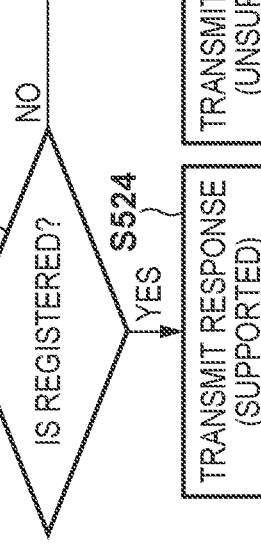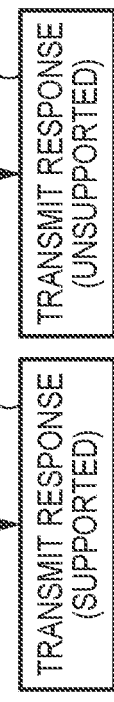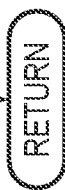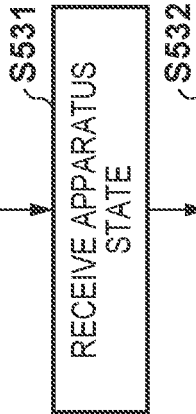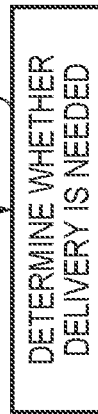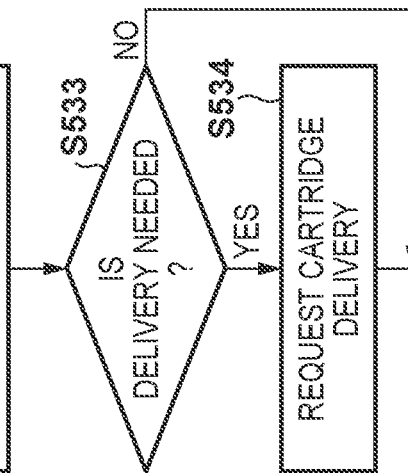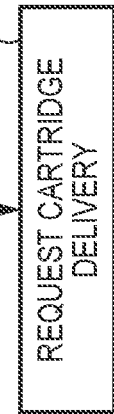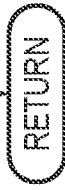

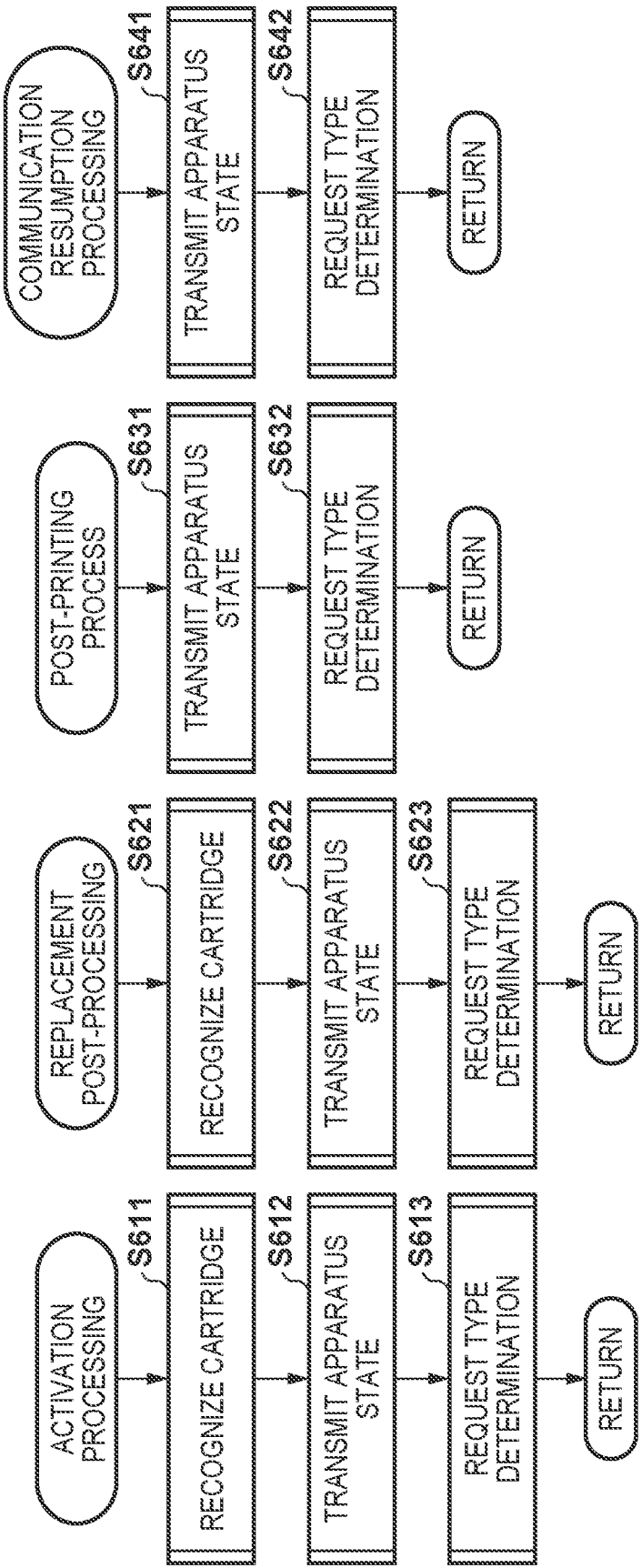

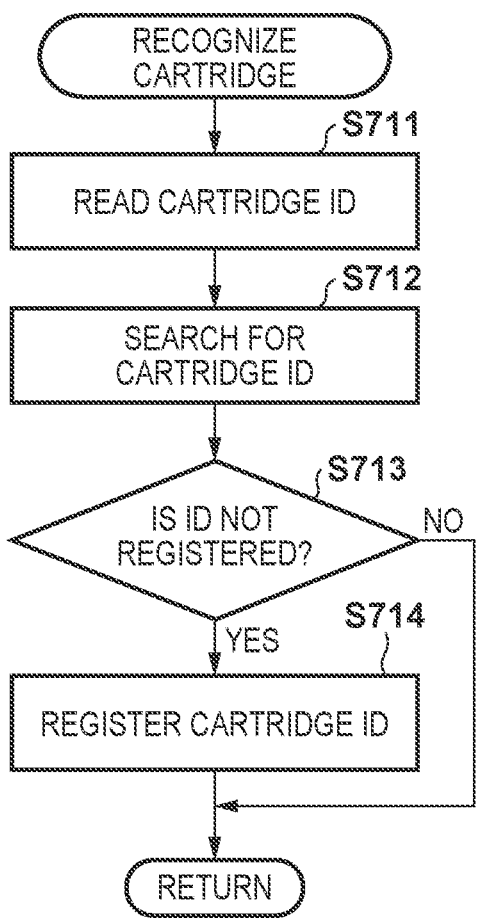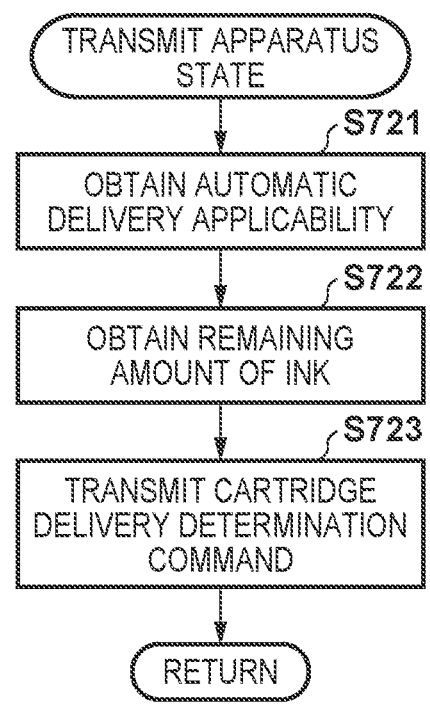

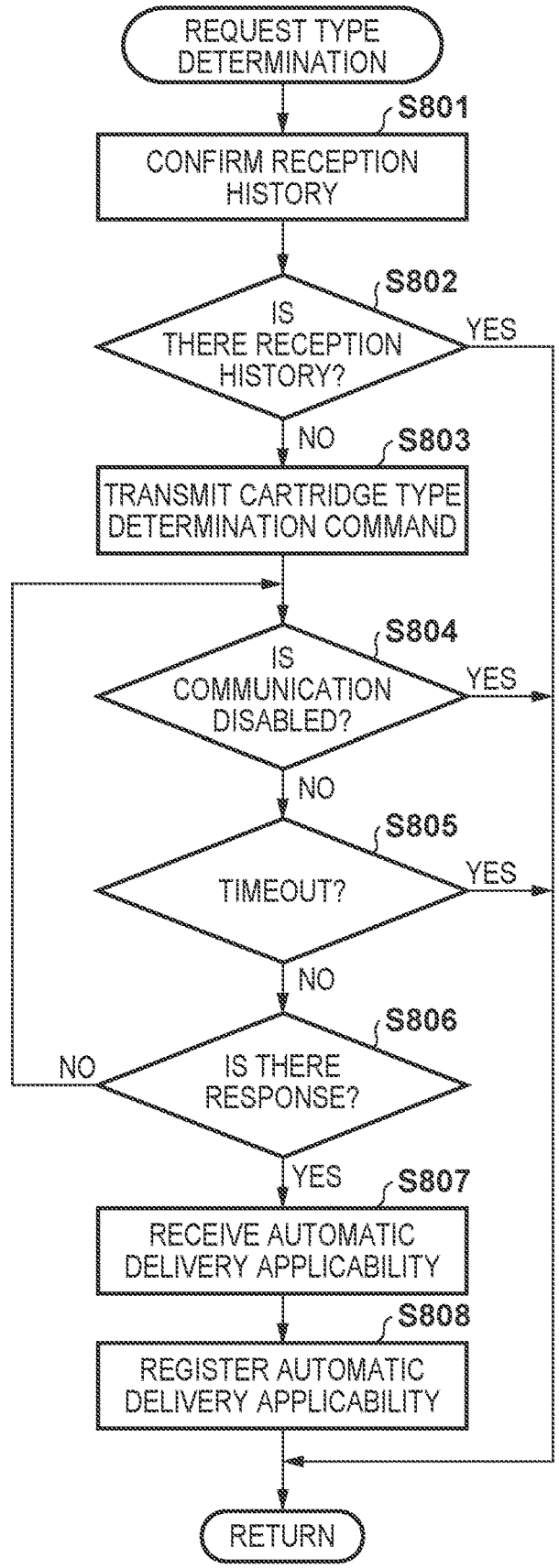

FIG. 9A

| | CARTRIDGE ID | RECEPTION HISTORY | AUTOMATIC DELIVERY APPLICABILITY |
|---|---|---|---|
| 00 | 1000 | TRUE | TRUE |
| 01 | | | |
| 02 | | | |
| 03 | | | |

FIG. 9B

| | CARTRIDGE ID | RECEPTION HISTORY | AUTOMATIC DELIVERY APPLICABILITY |
|---|---|---|---|
| 00 | 1000 | TRUE | TRUE |
| 01 | 2000 | FALSE | |
| 02 | | | |
| 03 | | | |

FIG. 9C

| | CARTRIDGE ID | RECEPTION HISTORY | AUTOMATIC DELIVERY APPLICABILITY |
|---|---|---|---|
| 00 | 1000 | TRUE | TRUE |
| 01 | 2000 | TRUE | FALSE |
| 02 | | | |
| 03 | | | |

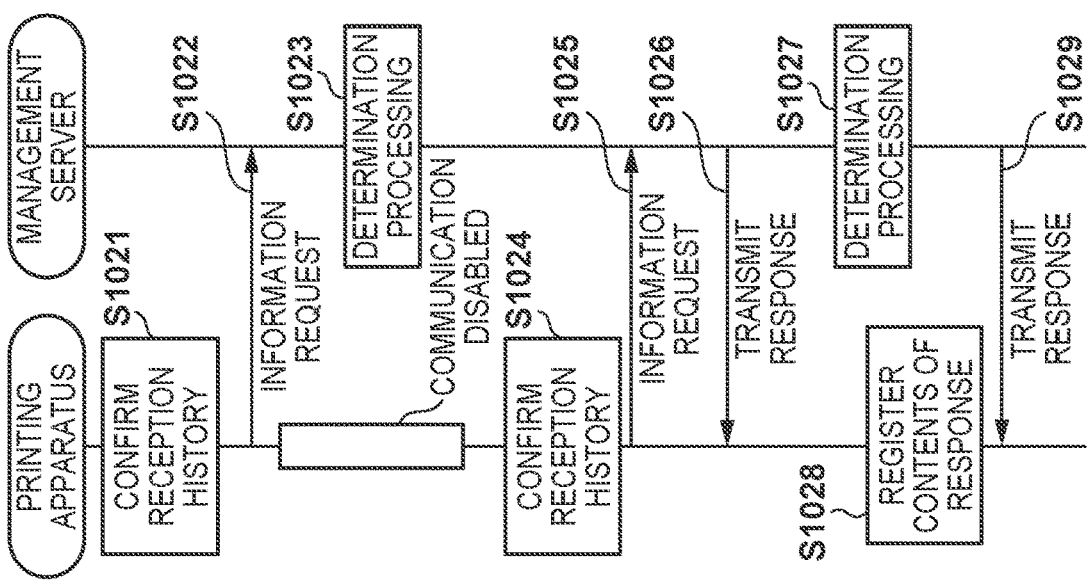
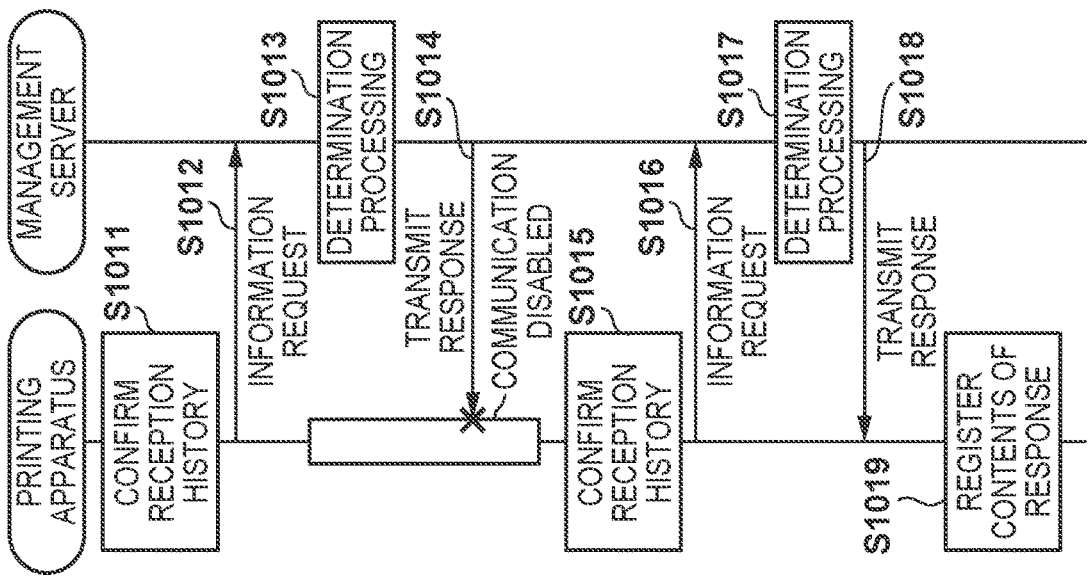
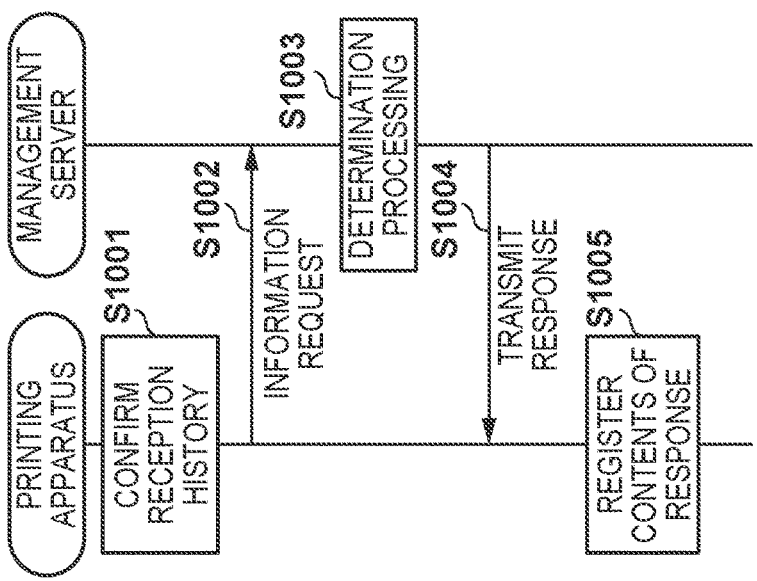

PRINTING APPARATUS AND METHOD OF CONTROLLING THE SAME

BACKGROUND

Field of the Invention

The present invention relates to a printing apparatus and a method of controlling the same.

Description of the Related Art

There is known a system that causes a server to manage consumables used in a printer or the like. For example, Japanese Patent Laid-Open No. 2018-17940 discloses that a management server will determine whether a toner container mounted on an image forming apparatus can be used.

SUMMARY

According to one embodiment of the present invention, there is provided a printing apparatus comprising: a mount unit configured to be able to mount a consumable; a communication unit configured to be able to communicate with a server system configured to provide a predetermined service; a request unit configured to request, to the server system via the communication unit, service-related information related to the consumable mounted on the mount unit; a reception unit configured to receive, via the communication unit, the service-related information transmitted from the server system with respect to the request by the request unit; and a determination unit configured to determine, in a case in which a state of the communication unit has shifted from a first state in which communication with the server system is disabled to a second state in which communication with the server system is enabled, whether a request for the service-related information by the request unit is required, based on a reception history of the service-related information of the reception unit.

According to another embodiment of the present invention, there is provided a method of controlling a printing apparatus, the printing apparatus including: a mount unit configured to be able to mount a consumable; and a communication unit configured to be able to communicate with a server system configured to provide a predetermined service, the method comprising: requesting, to the server system via the communication unit, service-related information related to the consumable mounted on the mount unit; receiving, via the communication unit, the service-related information transmitted from the server system with respect to the request by the request unit; and determining, in a case in which a state of the communication unit has shifted from a first state in which communication with the server system is disabled to a second state in which communication with the server system is enabled, whether a request for the service-related information by the requesting is required, based on a reception history of the service-related information of the receiving.

Further features will become apparent from the following description of exemplary embodiments (with reference to the attached drawings).

BRIEF DESCRIPTION OF THE DRAWINGS

FIG. 5A is a flowchart showing an example of control of the management server;

FIG. 5B a flowchart showing another example of the control of the management server;

FIG. 5C a flowchart showing still another example of the control of the management server;

FIG. 6A is a flowchart showing an example of control of the printing apparatus;

FIG. 6B is a flowchart showing another example of the control of the printing apparatus;

FIG. 6C is a flowchart showing still another example of the control of the printing apparatus;

FIG. 6D is a flowchart showing still another example of the control of the printing apparatus;

FIG. 7A is a flowchart showing the details of the control of the printing apparatus;

FIG. 7B is a flowchart showing the details of the control of the printing apparatus;

FIG. 8 is a flowchart showing the details of control of a printing apparatus;

FIG. 9A is a table showing an example of the arrangement of data stored in a storage unit of the printing apparatus;

FIG. 9B is a table showing another example of the arrangement of the data stored in the storage unit of the printing apparatus;

FIG. 9C is a table showing still another example of the arrangement of the data stored in the storage unit of the printing apparatus;

FIG. 10A is a sequence chart showing an operation procedure of the printing apparatus and the management server in type determination processing;

FIG. 10B is a sequence chart showing another operation procedure of the printing apparatus and the management server in the type determination processing; and FIG. 10C is a sequence chart showing still another operation procedure of the printing apparatus and the management server in the type determination processing.

DESCRIPTION OF THE EMBODIMENTS

In the above-described related art, it can take a comparatively long time for an image forming apparatus to receive a response when the image forming apparatus makes an inquiry to a management server about whether a toner container can be used. If the image forming apparatus is powered off or the like and a communication disabled state is set between the image forming apparatus and the management server during this time, the image forming apparatus may not be able to receive a response from the management server.

This embodiment provides a technique that allows information from a server to be obtained reliably.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be

1. Consumables Management System SY

<1.1. Overall Arrangement>

Figure 1:
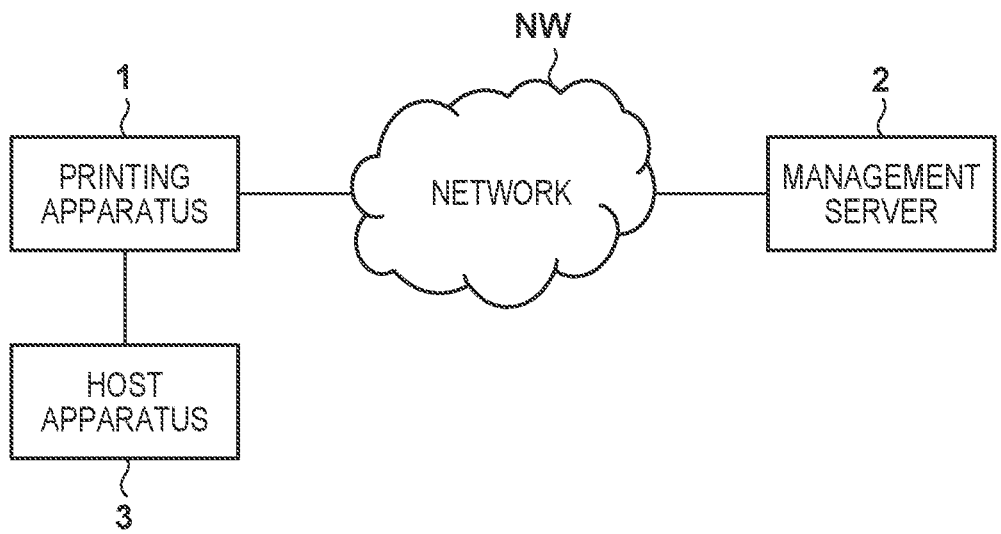
FIG. 1 is a block diagram showing the arrangement of a consumables management system according to an embodiment.

FIG. 1 is a block diagram showing the arrangement of a consumables management system SY according to an embodiment. The consumables management system SY includes a printing apparatus 1, a management server 2, and a host apparatus 3. The printing apparatus 1 and the host apparatus 3 are installed in an office or the like of a user and are connected to each other via a wireless local area network (LAN). The management server 2 is installed in an office or the like of a provider of a consumable automatic delivery service (to be described later), and is connected to the printing apparatus 1 via a network NW such as the Internet or the like. Note that the communication method via the network NW described above is merely an example, and it is possible to employ another communication method.

The printing apparatus 1 receives print job data including image data from the host apparatus 3, and prints an image on a print medium based on the received data. In this embodiment, the printing apparatus 1 is an inkjet printer that prints an image by discharging ink onto a print medium. However, the printing method of the printing apparatus 1 is not limited to this, and an electrophotographic printer may be employed. In addition, the printing apparatus 1 may be a multifunction printer including a scanner and the like, and may print an image based on the image data of an original read by the scanner.

<1.2. Operation Mode of Consumables Management System SY>

Figure 2:
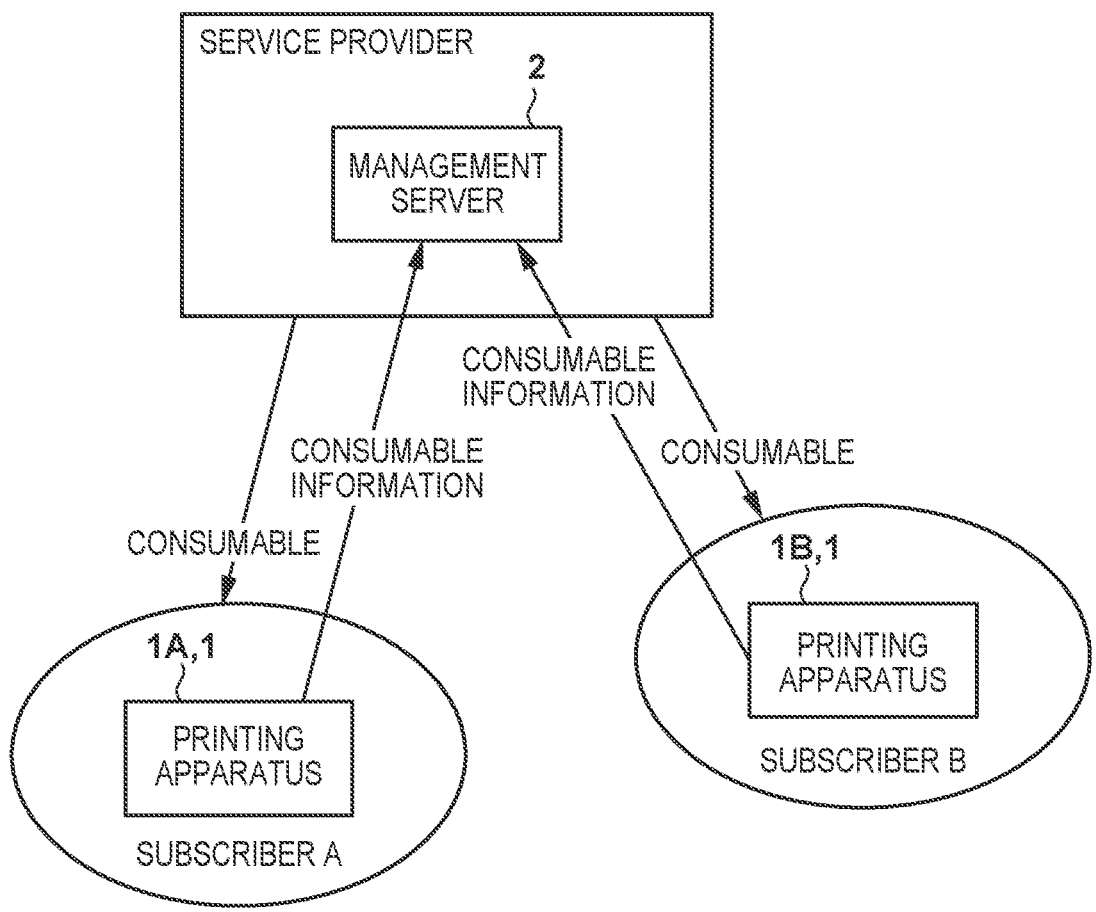
FIG. 2 is a view showing an example of the outline of an operation mode of a service that uses the consumables management system.

FIG. 2 is a view showing an example of the outline of an operation mode of a service that uses the consumables management system SY. The outline of the operation mode of a consumable automatic delivery service for ink cartridges 5 (see FIG. 3B) which are consumables to be mounted on the printing apparatus 1 is exemplified here. The printing apparatus 1 transmits information related to each consumable to the management server 2. When information related to a consumable is received from the printing apparatus 1, the management server 2 determines whether the consumable is supported by the consumable automatic delivery service. Subsequently, whether the new ink cartridge 5 needs to be delivered can be determined in accordance with the state of use of the consumable. Also, whether an additional fee is to be charged may also be determined. The service provider of the consumable automatic delivery service will send, based on the result of the determination by the management server 2, the ink cartridge 5 as a consumable to a subscriber. By such an operation mode, the new ink cartridge 5 will be delivered to the subscriber when the ink cartridge 5 needs to be replaced. Hence, the subscriber can use the printing apparatus 1 continuously without having to wait for the consumable to be delivered. Note that the management server 2 can be connected to a plurality of printing apparatuses 1 (a printing apparatus 1A and printing apparatus 1B), and can manage automatic delivery to a plurality of subscribers (a subscriber A and a subscriber B).

For example, the automatic delivery service can be a subscription service in which each ink cartridge 5 that has been automatically delivered can be used without an additional fee until the print count of the printing apparatus 1 reaches a predetermined count. Alternatively, for example, the automatic delivery service may be a quantity-based service in which the subscriber pays a fee in accordance with the number of the ink cartridges 5 that have been delivered. Note that the service to which this embodiment can be applied is not limited to the automatic delivery service. For example, it may be a service in which points are assigned to a subscriber in accordance with the number of the ink cartridges 5 used by the subscriber. In this case, the points assigned to the subscriber can be managed by the management server 2. Furthermore, a consumable is not limited to an item which is automatically delivered, and may be an item individually purchased by the user as long as it is a consumable supported by the service.

2. Printing Apparatus 1

<2.1. Hardware Arrangement>

Figure 3A:
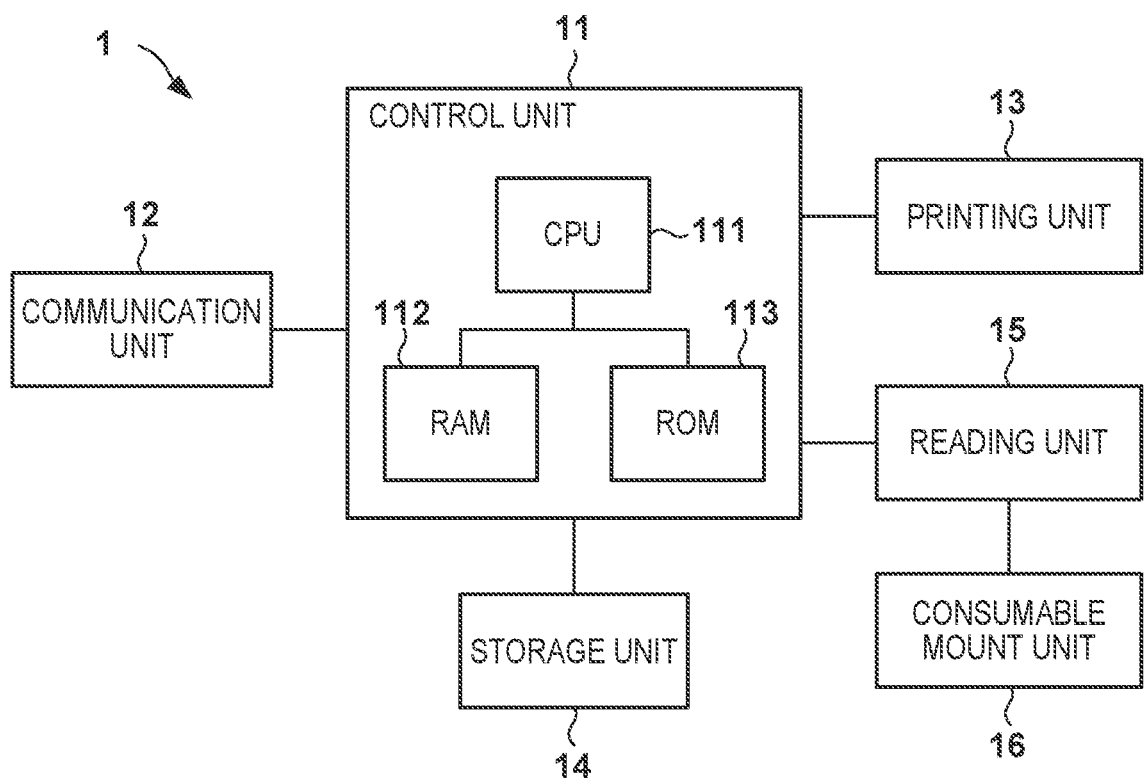
FIG. 3A is a block diagram showing the hardware arrangement of a printing apparatus.

FIG. 3A is a block diagram showing the hardware arrangement of the printing apparatus 1. The printing apparatus 1 includes a control unit 11, a communication unit 12, a printing unit 13, a storage unit 14, a reading unit 15, and a consumable mount unit 16. Note that the hardware arrangement shown in FIG. 3A is merely an example and can be changed appropriately.

The control unit 11 includes a central processing unit (CPU) 111 which generally controls the printing apparatus 1, a random access memory (RAM) 112 which serves as the main storage device for storing temporary data during a control operation, and a read only memory (ROM) 113 which stores control programs. For example, various kinds of functions related to the printing apparatus 1 are implemented by the CPU 111 reading out programs stored in the ROM 113 to the RAM 112 and executing the programs. That is, the control unit 11 can execute each function when the information processing by the software stored in the ROM 113 is specifically implemented by the CPU 111 as an example of hardware.

Note that at least some of the functions to be implemented by the control unit 11 may be implemented by a known semiconductor device such as a programmable logic device (P L D), an application specific integrated circuit (ASIC), or the like. In addition, although the control unit 11 is shown as a single element here, the control unit 11 may be divided into two or more elements as needed.

The communication unit 12 is a communication interface between the printing apparatus 1 and an external apparatus. For example, the control unit 11 receives, from the host apparatus 3, print job data which includes the image data via the communication unit 12. In addition, the control unit 11 will exchange information with the management server 2 via the communication unit 12. Note that although a wireless LAN is used as a connection means between the communication unit 12 and the network NW in this embodiment, another communication method may be used.

The printing unit 13 prints an image on a print medium. For example, the control unit 11 will cause the printing unit 13 to print an image based on the print job data received from the host apparatus 3 via the communication unit 12.

The storage unit 14 stores various kinds of information. For example, the control unit 11 stores the information received from the management server 2 in the storage unit 14. In this embodiment, the storage unit 14 is formed by a flash ROM which is a nonvolatile memory. Note that the storage unit 14 may be formed by another storage element as long as it is a nonvolatile memory.

The reading unit 15 reads the information of each ink cartridge 5 as a consumable mounted on the consumable mount unit 16.

<2.2. Consumable Mount Unit 16>

Figure 3B:
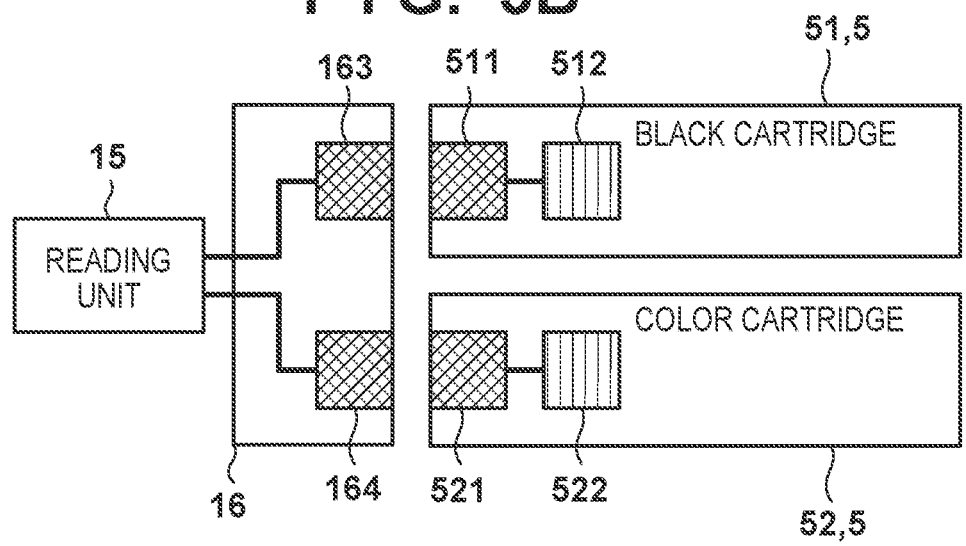
FIG. 3B is a schematic view illustrating the state in which a consumable mount unit and ink cartridges are connected.

FIG. 3B is a schematic view expressing the state of connection between the ink cartridges 5 and the consumable mount unit 16. In this embodiment, one black ink cartridge 51 and one color ink cartridge 52 as examples of the ink cartridges 5 can be detachably attached to the consumable mount unit 16.

When the black ink cartridge 51 is mounted on the consumable mount unit 16, a connection terminal 511 of the black ink cartridge 51 is electrically connected to a connection socket 163 of the consumable mount unit 16. At this time, the control unit 11 can control the reading unit 15 to read out the information written in a nonvolatile memory 512 of the black ink cartridge 51. In a similar manner, when the color ink cartridge 52 is mounted on the consumable mount unit 16, a connection terminal 521 is electrically connected to the connection socket 164. Hence, the control unit 11 can control the reading unit 15 to read out the information written in a nonvolatile memory 522. In this embodiment, the nonvolatile memory 512 and the nonvolatile memory 522 each store, as information related to the consumable, identification information (to be denoted as a cartridge ID hereinafter) which allows each individual body of the black ink cartridge 51 and the color ink cartridge 52 to be identified.

The control unit 11 and the management server 2 can use the cartridge IDs to identify the individual bodies of the ink cartridges 5 mounted on the printing apparatus 1. Note that the number or the type of the ink cartridges 5 to be mounted on the consumable mount unit 16 is not limited. For example, it may be arranged so that four types of ink cartridges, such as cyan, magenta, yellow, and black, can be mounted on the consumable mount unit 16. In addition, two or more of the same type of cartridge (for example, the black ink cartridge 51) may be mounted on the consumable mount unit 16.

The mode in which the reading unit 15 reads the cartridge ID can be changed. For example, each ink cartridge 5 may include a barcode, a QR Code®, or an IC tag which includes the cartridge ID as information, and the reading unit 15 may be a reader which can read such information.

3. Management Server 2

Figure 4:
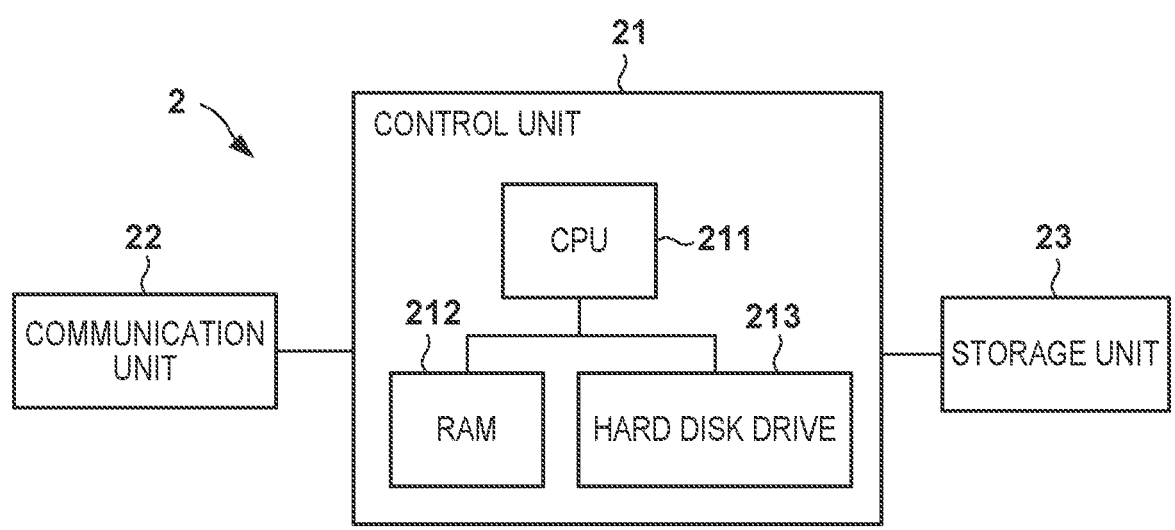
FIG. 4 is a block diagram showing the hardware arrangement of a management server.

FIG. 4 is a block diagram showing the hardware arrangement of the management server 2. The management server 2 includes a control unit 21, a communication unit 22, and a storage unit 23.

The control unit 21 includes a CPU 211 which generally controls the management server 2, a RAM 212 as the main storage device which stores temporary data during a control operation, and a hard disk drive 213 which stores control programs. For example, various kinds of functions related to the management server 2 are implemented by the CPU 211 reading out programs stored in the hard disk drive 213 to the RAM 212 and executing the programs. That is, the control unit 21 can execute each function when the information processing by the software stored in the hard disk drive 213 is specifically implemented by the CPU 211 as an example of hardware. Note that although an example in which the management server 2 is formed by a single server apparatus (information processing apparatus) will be described in this example, the embodiment is not limited to this. It may be arranged so that each function will be executed when a plurality of server apparatuses on a cloud operate in cooperation. That is, the management server 2 may be formed by a plurality of server apparatuses. In the present invention, an arrangement which is formed by a single server apparatus or a plurality of server apparatuses will also be referred to as a server system.

The communication unit 22 is a communication interface between the management server 2 and an external apparatus. For example, the control unit 21 will communicate with a plurality of the printing apparatuses 1 via the communication unit 22. Note that although a wired LAN is used as a connection means between the communication unit 22 and the network NW in this embodiment, another communication method may be used.

The storage unit 23 stores various kinds of information related to the automatic delivery service. Although the storage unit 23 is formed by a hard disk drive in this embodiment, another mode can also be employed appropriately.

4. Example of Control 4.1. Example of Control of Management Server 2

FIGS. 5A to 5C are flowcharts each showing an example of the control of the management server 2. The behavior of the management server 2 in the consumable automatic delivery service according to this embodiment will be described hereinafter. Each of the procedures of the flowcharts of FIGS. 5A to 5C is implemented by the CPU 211 reading out a program stored in the hard disk drive 213 to the RAM 212 and executing the program. Also, in the management server 2, when the communication unit 22 receives a command from the printing apparatus 1 or another client apparatus (for example, an information processing apparatus such as a personal computer), the control unit 21 will execute processing corresponding to the command. FIGS. 5A to 5C each show processing to be executed by the control unit 21 when a command is received. Note that in the following description, each step will be denoted simply in the manner of S511 or the like.

FIG. 5A is a flowchart showing processing (cartridge registration processing) for preregistering the cartridge ID of each ink cartridge 5 to be delivered to a subscriber. The processing procedure of this flowchart is executed by the control unit 21 when a cartridge registration command is received by the communication unit 22. In this embodiment, the cartridge registration command is a command to store, in the storage unit 23, the cartridge ID of each ink cartridge 5 to be automatically delivered to the subscriber. For example, the cartridge registration command is automatically issued by a cartridge production management server (not shown). Alternatively, for example, the cartridge registration command may be manually issued from an arbitrary client apparatus by a cartridge inventory manager.

In S511, the control unit 21 receives, via the communication unit 22, an arbitrary number of cartridge IDs. In S512, the control unit 21 stores the received cartridge IDs in the storage unit 23. At this time, the control unit 21 will store each cartridge ID in association with the information related to the subscriber as the delivery target or with the information (the identification information of the printing apparatus 1) related to the printing apparatus 1 used by the subscriber. This above-described processing will allow the management server 2 to store the information of the cartridges which are to be automatically delivered.

Although details will be described later, whether each of the ink cartridges 5 mounted on the printing apparatus 1 of the subscriber is a cartridge provided by the service (an ink cartridge supported by the service) will be confirmed in the consumable automatic delivery service. The management server 2 can execute the cartridge registration processing in advance to perform this kind of confirmation operation.

FIG. 5B is a flowchart showing type determination processing of each ink cartridge 5 mounted on the printing apparatus 1. The processing procedure of this flowchart is executed by the control unit 21 when the communication unit 22 has received a cartridge type determination command issued from the printing apparatus 1. In this embodiment, the cartridge type determination command is a command for determining whether the cartridge ID of the ink cartridge 5 mounted on the printing apparatus 1 is the cartridge ID stored in the storage unit 23 by the cartridge registration processing shown in FIG. 5A.

In S521, the control unit 21 receives, from the printing apparatus 1 via the communication unit 22, the cartridge ID of the ink cartridge 5 mounted on the printing apparatus 1. Although it will be assumed here that the number of cartridge IDs to be received will be one per command in this embodiment, it may be arranged so that the control unit 21 will receive a plurality of cartridge IDs per command.

In S522, the control unit 21 searches for the cartridge ID received in S521. In one example, the cartridge registration processing of FIG. 5A is performed to confirm whether the information related to the printing apparatus 1 which transmitted the cartridge type determination command and the cartridge ID received in S521 are stored in the storage unit 14 in association with each other. If it is determined that the information and the cartridge ID have been stored in storage unit 14 in association with each other, the control unit 21 can confirm that the cartridge ID received in S521 is registered in the storage unit 14.

S523 is a conditional branch based on the search result of S522. If it is determined that the cartridge ID is registered in the storage unit 23, the control unit 21 will advance the process to S524. If the cartridge ID is not registered in storage unit 23, the process will advance to S525.

In S524, the control unit 21 will transmit, to the printing apparatus 1 via the communication unit 22, a response indicating that the mounted ink cartridge is applicable as an automatic delivery cartridge which is supported by the automatic delivery service, and the processing of the flowchart will end.

On the other hand, if the process advances from S523 to S525, the control unit 21 will transmit, to the printing apparatus 1 via the communication unit 22, a response indicating that the mounted ink cartridge is not applicable as an auto-delivery cartridge, and the processing of the flowchart will end.

The above-described processing allows the management server 2 to determine whether each ink cartridge 5 mounted on the printing apparatus 1 is applicable as an automatic delivery cartridge and to notify the printing apparatus 1 of the result of the determination.

FIG. 5C is a flowchart showing processing to determine whether the ink cartridge 5 needs to be delivered. The processing procedure of this flowchart is executed by the control unit 21 when the communication unit 22 has received a cartridge delivery determination command issued by the printing apparatus 1. The cartridge delivery determination command is a command to request the delivery of the ink cartridge 5 in accordance with the state of the printing apparatus 1 or the ink cartridge 5.

In S531, the control unit 21 receives, from the printing apparatus 1 via the communication unit 22, information related to the state of the printing apparatus 1. The information related to the state of the printing apparatus 1 can include, for example, information as to whether the ink cartridge 5 which has been automatically delivered is mounted. The information related to the state of the printing apparatus 1 can also include the remaining ink amount of the ink cartridge 5 mounted on the printing apparatus 1.

In S532, the control unit 21 refers to the information related to the state of the printing apparatus 1 received in S531 to determine whether ink cartridge 5 needs to be delivered. For example, it may be determined that the ink cartridge 5 needs to be delivered if the ink cartridge 5 which has been automatically delivered is mounted on the printing apparatus 1 and the remaining ink amount of the ink cartridge 5 is a predetermined value or less.

S533 is a conditional branch based on the determination result of S532. If it is determined in S532 that the ink cartridge 5 needs to be delivered, the control unit 21 will advance the process to S534. If it is determined in S532 that the ink cartridge 5 does not need to be delivered, the processing of the flowchart will end.

In S534, the control unit 21 transmits, via the communication unit 22, information requesting the delivery of the ink cartridge 5, and the processing of the flowchart ends. In this embodiment, the transmission destination is a cartridge order management server (not shown). For example, the cartridge order management server manages the delivery destination information and the like of consumables, and arranges for the ink cartridge 5 to be delivered to the delivery destination of the target subscriber when a request to deliver the ink cartridge 5 is received from the management server 2. Note that the transmission destination in S534 is not limited to the cartridge order management server.

The above-described processing allows the management server 2 to place an order so that the ink cartridge 5 will be delivered to the user of the printing apparatus 1 in which the ink cartridge 5 will need to be replaced.

The behavior of the management server 2 illustrated in FIGS. 5A to 5C will allow the ink cartridge 5 to be automatically delivered without any shortage or excess to the user of the printing apparatus 1 using the automatic delivery service.

4.2. Example of Control of Printing Apparatus 1

FIGS. 6A to 6D are flowcharts each showing an example of control of the printing apparatus 1. The behavior of the printing apparatus 1 in the consumable automatic delivery service according to this embodiment will be described hereinafter. The control unit 11 will execute the processing operations shown in FIGS. 6A to 6D after, for example, the user of the printing apparatus 1 has performed an operation.

FIG. 6A is a flowchart showing processing executed by the control unit 11 when the user has activated the printing apparatus 1 by performing an operation to power on the printing apparatus.

In S611, the control unit 11 executes cartridge recognition processing. The cartridge recognition processing is processing to cause the reading unit 15 to read out the cartridge ID from each ink cartridge 5 mounted on the consumable mount unit 16. This processing will be described in detail later.

In S612, the control unit 11 executes apparatus state transmission processing. In this embodiment, the apparatus state transmission processing is processing performed to notify the management server 2 of the state of the printing apparatus 1. Although details will be described later, note that this processing includes processing to transmit the cartridge delivery determination command to the management server 2. That is, the management server 2 will execute the processing of the flowchart of FIG. 5C based on the processing of S612 by the control unit 11.

In S613, the control unit 11 executes cartridge type determination processing. In this embodiment, the cartridge type determination processing is processing to transmit, as needed, the cartridge type determination command to the management server 2 and receive, as a response, information (to be denoted as automatic delivery applicability information hereinafter) related to whether the mounted ink cartridge is applicable as an automatic delivery cartridge. This processing will be described in detail later. The processing of this flowchart ends when the processing of S613 ends. Note that the printing apparatus 1 can be arranged to be operable by the user even while the control unit 11 is executing the processes of S612 and S613.

Note that the automatic delivery applicability information is, in other words, information that indicates whether the ink cartridge 5 as an example of a consumable is an ink cartridge which has been provided in accordance with the contract related to the use of the printing apparatus 1 (an ink cartridge which is supported by the service). Furthermore, the contract related the use of the printing apparatus 1 can be said to be a contract related to the delivery of the ink cartridge 5 as an example of a consumable to be mounted on the printing apparatus 1. Note that in a case in which the service is a service related to point assignment, in S613, the control unit 11 will receive, as a response from the management server 2, information indicating whether the mounted ink cartridge is an ink cartridge supported by the service which assigns points when the ink cartridge 5 is used.

FIG. 6B is a flowchart showing processing performed by the control unit 11 when the user has replaced the ink cartridge 5 of the printing apparatus 1 and has mounted the replaced ink cartridge on the consumable mount unit 16. The processes of S621 to S623 are similar to those of S611 to S613, respectively. Note that the printing apparatus 1 can be formed so that it can be operated by the user even while the control unit 11 is executing the processes of S622 and S623.

FIG. 6C is a flowchart showing processing performed by the control unit 11 after the printing apparatus 1 has received image data from the host apparatus 3 and the printing unit 13 has printed an image on a print medium. The processes of S631 and S632 are similar to those of S612 and S613, respectively. Since the mounted state of each ink cartridge 5 on the consumable mount unit 16 does not change here, the control unit 11 will omit the cartridge recognition processing corresponding to that of S611 of FIG. 6A. Note that the printing apparatus 1 can receive image data from the host apparatus 3 and cause the printing unit 13 to print the image on a print medium even while the processing of the flowchart shown in FIG. 6C is being executed.

FIG. 6D is a flowchart showing processing executed by the control unit 11 when communication with the management server 2 is enabled again when the communication has been disabled after the activation of the printing apparatus 1. For example, the temporary disconnection of the wireless LAN connection between the communication unit 12 and the network NW can be raised as a cause of the disablement of the communication between the printing apparatus 1 and the management server 2. The processes of S641 and S642 are similar to those of S612 and S613, respectively. The printing apparatus 1 can receive image data from the host apparatus 3 and cause the printing unit 13 to print the image on a print medium even while the processing of the flowchart shown in FIG. 6D is being executed. Note that the processing of the flowchart shown in FIG. 6D will be executed when the printing apparatus 1 has shifted from a state in which communication with the management server 2 is disabled to a state in which communication is enabled in a state in which the printing apparatus 1 has already been activated. Hence, when the printing apparatus 1 shifts to a state in which communication with the management server 2 is enabled at the activation of (at the powering on of) the printing apparatus 1, the control unit 11 will execute processing in accordance with the flowchart shown in FIG. 6A.

FIGS. 7A, 7B, and 8 are flowcharts each showing the details of the control of the printing apparatus 1. In addition, FIGS. 9A to 9C are tables each showing an example of the structure of data stored in the storage unit 14 of the printing apparatus 1.

Note that in FIGS. 9A to 9C, a reception history "TRUE" indicates that a cartridge identified by the target cartridge ID has received the automatic delivery applicability information. In addition, a reception history "FALSE" indicates that a cartridge identified by the target cartridge ID has not received the automatic delivery applicability information. Also, automatic delivery applicability "TRUE" indicates that the cartridge identified by the target cartridge ID is applicable as an automatic delivery cartridge. Furthermore, automatic delivery applicability "FALSE" indicates that the cartridge identified by the target cartridge ID is not applicable as an automatic delivery cartridge.

In addition, in this embodiment, the storage unit 14 stores the cartridge information related to a consumable (ID) in association with service-related information. Note that the storage unit 14 can store a plurality of records of these associations. The storage unit 14 can store, as the service-related information, information (reception history) expressing whether the printing apparatus 1 has received the automatic delivery applicability information. The storage unit 14 can also store, as the service-related information, the automatic delivery applicability information of the target ink cartridge 5. In this embodiment, the control unit 11 will perform storage control on the storage of the automatic delivery applicability information by the storage unit 14.

Note that in this embodiment, the storage unit 14 will separately manage the information of the black ink cartridge 51 and the information of the color ink cartridge 52. That is, a database for managing the information of the black ink cartridge 51 and a database for managing the information of the color ink cartridge 52 will be constructed separately in the storage unit 14. Note that the arrangement of the storage unit 14 is not limited to this. For example, the information of a plurality of kinds of ink cartridges 5 may be managed together. The processing operations performed by the control unit 11 of the printing apparatus 1 will be described in detail with reference to FIGS. 7A to 9C hereinafter.

FIG. 7A is a flowchart showing the cartridge recognition processing, that is, the more specific processing executed in S611 of FIG. 6A.

In S711, the control unit 11 reads the cartridge ID of each ink cartridge 5 mounted on the consumable mount unit 16. For example, the control unit 11 will cause the reading unit 15 to read out the cartridge ID stored in the nonvolatile memory 512 of the black ink cartridge 51 and the cartridge ID stored in the nonvolatile memory 522 of the color ink cartridge 52. The control unit 11 stores the cartridge IDs read out by the reading unit 15 in the RAM 112.

In S712, the control unit 11 searches whether each cartridge ID read and stored in the RAM 112 in S711 is stored in the storage unit 14.

S713 is a conditional branch based on the search result of S712. If the cartridge ID read in S711 is not stored in the storage unit 14, that is, if the cartridge ID is not registered, the control unit 11 will advance the process to S714. On the other hand, if the cartridge ID read in S711 is stored in the storage unit 14, that is, if the cartridge ID is registered, the control unit 11 will end the processing of the flowchart.

In S714, the control unit 11 stores (registers) the cartridge ID read in S711 in the storage unit 14. Subsequently, the control unit 11 ends the processing of the flowchart.

An example of the registration procedure of the cartridge ID based on the processing of the flowchart of FIG. 7A will be described next. In the following description, assume that the data of the black ink cartridge 51 stored in the storage unit 14 is in the state shown in FIG. 9A. Also, in the following description, assume that the processing of the flowchart of FIG. 7A has been started in a case in which the black ink cartridge 51 whose cartridge ID is "2000" has been mounted on the consumable mount unit 16.

First, the control unit 11 causes the reading unit 15 to read the cartridge ID of the black ink cartridge 51 mounted on the consumable mount unit 16 (S711). Subsequently, the control unit 11 searches (S712) whether the read cartridge ID (2000) is stored in the storage unit 14. However, since the ID is not stored in the storage unit 14, the control unit 11 registers the cartridge ID (S713→S714). More specifically, the control unit 11 registers "2000" as the cartridge ID in a new area of the storage unit 14. Also, in this state, the printing apparatus 1 has not received a response, from the management server 2, as to whether the black ink cartridge 51 is an automatic delivery cartridge. Hence, the control unit 11 stores, in the storage unit 14, information indicating that the reception history of this ID is "FALSE" (FIG. 9B).

The above-described processing allows the cartridge ID of the ink cartridge 5 mounted on the consumable mount unit 16 to be stored in the storage unit 14 when the cartridge ID is not stored in the printing apparatus 14.

FIG. 7B is a flowchart showing the apparatus state transmission processing, that is, the more specific processing executed in S612 of FIG. 6A.

In S721, the control unit 11 obtains the automatic delivery applicability information. For example, the control unit 11 reads out, from the RAM 112, the cartridge ID of the ink cartridge 5 mounted on the consumable mount unit 16. Subsequently, the control unit 11 obtains, from the storage unit 14, the automatic delivery applicability information related to the cartridge ID which has been read out. Note that the cartridge ID of the ink cartridge 5 can be stored in the RAM 112 by the cartridge recognition processing.

For example, assume that the ink cartridge 5 whose cartridge ID is "1000" is mounted on the consumable mount unit 16 and the data of the ink cartridge 5 stored in the storage unit 14 is in the state shown in FIG. 9C. In such a case, the control unit 11 first obtains information that the cartridge ID of the ink cartridge 5 mounted on the consumable mount unit 16 is "1000". Subsequently, based on the fact that the automatic delivery applicability of the cartridge ID "1000" is indicated as "TRUE", the control unit 11 specifies that the ink cartridge 5 mounted on the consumable mount unit 16 is applicable as an automatic delivery cartridge.

In S722, the control unit 11 obtains the remaining ink amount of the ink cartridge 5. The remaining ink amount of the ink cartridge 5 can be estimated from, for example, the ink discharge count (dot count) during the printing by the printing unit 13. Note that the remaining ink amount estimation method is not limited to this. For example, the remaining ink amount may be physically detected by a sensor or the like by electrically detecting the presence/absence of ink by using an electrode pin.

In S723, the control unit 11 transmits, via the communication unit 12, the cartridge delivery determination command to the management server 2. At this time, the control unit 11 also transmits the automatic delivery applicability information of the ink cartridge 5 obtained in S721 to the management server 2. In addition, the control unit 11 also transmits the remaining ink amount of the ink cartridge 5 obtained in S722 to the management server 2. Subsequently, the control unit 11 ends the processing of the flowchart.

A case in which the ink cartridge 5 whose cartridge ID is "2000" is mounted on the consumable mount unit 16 and the data of this ink cartridge 5 stored in the storage unit 14 is in the state shown in FIG. 9C will be described here. In this case, since it will be specified in S721 that the automatic delivery applicability is "FALSE", the control unit 11 will transmit, to the management server 2 in S723, information indicating that the ink cartridge 5 mounted on the consumable mount unit 16 is not an automatic delivery cartridge. In this case, the control unit 21 of the management server 2 will determine in S532 that delivery is unnecessary.

Note that a case in which the user of the printing apparatus 1 is not subscribed to the automatic delivery service of the ink cartridge 5 can be raised as a case in which the ink cartridge 5 is not applicable as an automatic delivery cartridge. Another case can be a case in which the user of the printing apparatus 1 is subscribed to the automatic delivery service, but the user has purchased, for some kind of reason, the commercially sold ink cartridge 5 and has mounted the bought ink cartridge on the consumable mount unit 16. In this embodiment, the control unit 21 of the management server 2 will determine that the automatic delivery of the ink cartridge 5 is unnecessary in such cases.

FIG. 8 is a flowchart showing type determination request processing, that is, a more specific processing example of S613 of FIG. 6A.

In S801, the control unit 11 confirms the reception history of the response to the type determination request. For example, the control unit 11 reads out, from the RAM 112, the cartridge ID of the ink cartridge 5 mounted on the consumable mount unit 16. Subsequently, the control unit 11 obtains, from the storage unit 14, the automatic delivery applicability information related to the cartridge ID that has been read out, that is, obtains information indicating the presence/absence of the reception history of the response to the type determination request.

For example, assume that the ink cartridge 5 whose cartridge ID is "1000" is mounted on the consumable mount unit 16 and the data of the ink cartridge 5 stored in the storage unit 14 is in the state shown in FIG. 9B. In this case, "TRUE" which is information indicating that the response to the type determination request has been received is present for the cartridge ID "1000". Hence, the control unit 11 can recognize that the ink cartridge 5 whose cartridge ID is "1000" has already received the response to the type determination request, that is, has a reception history of the response to the type determination request.

Also, for example, assume that the ink cartridge 5 whose cartridge ID is "2000" is mounted on the consumable mount unit 16 and the data of the ink cartridge 5 stored in the storage unit 14 is in the state shown in FIG. 9B. In this case, "FALSE" which is information indicating that the response to the type determination request has not been received is present for the cartridge ID "2000". Hence, the control unit 11 can recognize that the ink cartridge 5 whose cartridge ID is "2000" has not been received the response to the type determination request, that is, does not have a reception history of the response to the type determination request.

S802 is a conditional branch based on the confirmation result of S801. If it is recognized in S801 that the reception history is present, the control unit 11 will end the processing of the flowchart. That is, if the response result to the type determination request is already stored in the storage unit 14, the transmission of the cartridge type determination command (S803) from the control unit 11 to the management server 2 will be omitted. This will reduce the load of the management server 2. On the other hand, if it is recognized in S801 that the reception history is absent, the control unit 11 will advance the process to S803.

Note that if the reception history of one or both of the black ink cartridge 51 and the color ink cartridge 52 is absent, the control unit 11 may perform the processing operations of S803 and subsequent steps for the ink cartridge 5 without the reception history. Alternatively, the control unit 11 may separately execute the processing itself of the flowchart shown in FIG. 8 for a case in which the black ink cartridge 51 is the target and a case in which the color ink cartridge 52 is the target.

In S803, the control unit 11 transmits, via the communication unit 12, the cartridge type determination command to the management server 2. At this time, the control unit 11 also transmits the cartridge ID of the ink cartridge 5 without the reception history to the management server 2. Subsequently, from the processes of S804 to S806, the control unit 11 will stand by for the communication unit 12 to receive a response to the cartridge type determination command from the management server 2.

S804 is a conditional branch based on whether the communication between the communication unit 12 of the printing apparatus 1 and the management server 2 has been disabled. If the communication between the communication unit 12 and the management server 2 is disabled, the control unit 11 will end the processing of the flowchart. On the other hand, if the communication between the communication unit 12 and the management server 2 is enabled, the control unit 11 will advance the process to S805.

S805 is a conditional branch based on whether the standby state has continued for a predetermined time or more, that is, whether a timeout has occurred, since the command transmission. Depending on the state of the load of the management server 2, it may take some time until a response is received after the command has been transmitted. Hence, the control unit 11 will stand by to receive a response by repeatedly performing the processes of S804 to S806 until a timeout occurs (for example, one minute from the command transmission). If the standby state set after the transmission of the command has timed out, the control unit 11 will exit the standby state and end the processing of the flowchart. On the other hand, if the standby state set after the transmission of the command has not timed out, the control unit 11 will advance the process to S806.

S806 is a conditional branch based on whether the communication unit 12 has received a response from the management server 2. If the communication unit 12 has not received a response from the management server 2, the control unit 11 will return the process to S804. Hence, after S803, the control unit 11 will repeat the processes of S804 to S806 while the process does not shift to the end of processing of the flowchart at the conditional branch of S804 or S805. On the other hand, if the communication unit 12 has received a response from the management server 2, the control unit 11 will advance the process to S807.

In S807, the control unit 11 receives, via the communication unit 12, the information related to the automatic delivery applicability from the management server 2. In this manner, the control unit 11 will confirm, from the management server 2 via the communication unit 12 which can communicate with the management server 2 as an external apparatus, the information related to the automatic delivery applicability information as an example of the service-related information concerning the consumable mounted on the consumable mount unit 16.

In S808, the control unit 11 stores (registers) the information received in S807 in the storage unit 14. Subsequently, the processing of the flowchart ends.

For example, assume that the ink cartridge 5 whose cartridge ID is "2000" is mounted on the consumable mount unit 16 and the data of the ink cartridge 5 stored in the storage unit 14 is in the state shown in FIG. 9B. Assume also that the communication unit 12 has received information indicating that this ink cartridge 5 is not applicable as an automatic delivery cartridge. In such a case, as shown in FIG. 9C, the control unit 11 will register the automatic delivery applicability "FALSE", which indicates that this mounted ink cartridge is not applicable as an automatic delivery cartridge, as information related to the cartridge ID "2000" in a predetermined position of the storage unit 14. In addition, the control unit 11 will rewrite the reception history of the cartridge ID "2000", which is registered in the predetermined position of the storage unit 14, to "TRUE" indicating that the response has been received. After the process of S808, the control unit 11 ends the processing of the flowchart.

5. More Specific Procedure of Type Determination Request Processing

FIGS. 10A to 10C are sequence charts each showing the operation procedure of the printing apparatus 1 and the management server 2 in the type determination processing. Each sequence chart shows the procedure performed when the printing apparatus 1 executes the type determination request processing shown in S613 of FIG. 6A, more specifically, the processing of the flowchart shown in FIG. 8.

The consumables management system SY is formed so that the printing apparatus 1 will be able to reliably receive a response to the type determination request, as an example of service-related information, based on the processing performed by the printing apparatus 1 and the management server 2 described above. Each of the sequence charts of FIGS. 10A to 10C is a sequence chart for explaining how the printing apparatus 1 can reliably receive a response from the management server 2 even in a case in which the communication unit 12 is temporarily set in a communication disabled state with the management server 2.

Note that each sequence chart shows the procedure performed when the ink cartridge 5 whose cartridge ID is "2000" is mounted on the consumable mount unit 16 and the data of the ink cartridge 5 stored in the storage unit 14 is in the state shown in FIG. 9B. For example, when the user turns on the power after mounting the ink cartridge 5 on the consumable mount unit 16, the printing apparatus 1 and the management server 2 will undergo the processes of S611 and S612 and operate in accordance with the procedure shown in each sequence chart.

The sequence chart of FIG. 10A shows the procedure executed when the communication unit 12 of the printing apparatus 1 is able to continuously communicate with the management server 2.

First, in S1001, the control unit 11 confirms the reception history of the response to the type determination request (S801 of FIG. 8). Since the reception history of the ink cartridge 5 whose cartridge ID is "2000" is "FALSE" (FIG. 9B), the control unit 11 transmits, in S1002, an information request (cartridge type determination command) to the management server 2 (S803 of FIG. 8).

In S1003, the management server 2 executes the determination processing of the received request. Subsequently, in S1004, the management server 2 transmits a response corresponding to the result of the determination processing. More specifically, the management server 2 determines, in accordance with the processing procedure of the flowchart of FIG. 5B, whether the cartridge ID received from the printing apparatus 1 is the cartridge ID registered by the cartridge recognition processing of FIG. 5A (S521 to S523). Subsequently, the management server 2 transmits a response corresponding to the determination result to the printing apparatus 1 (S524 and S525).

In S1005, the control unit 11 registers the contents of the response from the management server 2. More specifically, the reception history of the cartridge ID "2000" registered in a predetermined position of the storage unit 14 is rewritten from "FALSE" to "TRUE" indicating that the cartridge ID has been received. The control unit 11 also registers the automatic delivery applicability "FALSE", which indicates that the mounted ink cartridge is not applicable as an automatic delivery cartridge, as the information related to the cartridge ID "2000" in a predetermined position in the storage unit 14.

In this manner, when the communication unit 12 is able to continuously communicate with the management server 2, the communication unit 12 can receive, from the management server 2, the response transmitted for the first information request from the control unit 11. Note that if the printing apparatus 1 is subsequently reactivated again, the printing apparatus 1 will execute the type determination processing again. However, since the reception history of the cartridge ID "2000" has been rewritten into "TRUE" by the processing described above, the control unit 11 will advance the process to "YES" at the conditional branch of S802. This will suppress the information request (the cartridge type determination command) from being transmitted again to the management server 2, thereby reducing the processing load of the management server 2.

The sequence chart of FIG. 10B shows an example of the procedure executed when the communication unit 12 of the printing apparatus 1 becomes unable to communicate with the management server 2. For example, the communication unit 12 can become unable to communicate with the management server 2 when the printing apparatus 1 is powered off.

The processes of S1011 to S1013 are similar to those of S1001 to S1003. Although the management server 2 will transmit a response in S1014, the communication unit 12 will not be able to receive this transmitted response because the communication unit 12 is in a communication disabled state. Subsequently, when the communication unit 12 returns to a communication enabled state, the type determination processing of S613 will be executed again in, for example, the activation processing of FIG. 6A, and the control unit 11 will confirm the reception history again in S1015. Since the communication unit 12 could not receive the transmitted response in S1014, the reception history of the ink cartridge 5 whose cartridge ID is "2000" is kept unchanged as "FALSE". Hence, in S1016, the control unit 11 will transmit an information request again to the management server 2 (S802 and S803 in FIG. 8). Subsequently, the management server 2 will execute, in S1017, the determination processing of this information request in a manner similar to that in S1013, and transmit a response in S1018. In S1019, the control unit 11 will register the contents of the response.

In this manner, even if the communication unit 12 is set in a communication disabled state when the control unit 11 has issued an information request to the management server 2 and is standing by for a response, the control unit 11 will issue an information request to the management server 2 again in accordance with the presence/absence of the reception history of the type determination request. Hence, the printing apparatus 1 will be able to reliably receive the information from the management server 2.

The sequence chart of FIG. 10C shows a further example of the procedure executed when the communication unit 12 of the printing apparatus 1 becomes unable to communicate with the management server 2.

The processes of S1021 to S1023 are similar to those of S1001 to S1003. When the communication unit 12 returns to a communication enabled state from a communication disabled state, the type determination processing of S613 will be executed again in, for example, the activation processing of FIG. 6A, and the control unit 11 will confirm the reception history again in S1024. Since the management server 2 has not transmitted a response at this point, the reception history of the ink cartridge 5 whose cartridge ID is "2000" is kept unchanged as "FALSE". Hence, the control unit 11 will transmit an information request (S802 and S803 of FIG. 8) to the management server 2 again in S1025. Subsequently, in S1026, the management server 2 will transmit a response to the first information request (S1022). In addition, in S1027, the management server 2 will execute the determination processing of the second information request (S1025). In S1028, the control unit 11 will register the contents of the response based on the response (S1026) transmitted for the first information request (S1022).

After the registration, the control unit 11 will receive, from the management server 2, the response (S1029) transmitted for the second information request (S1025). However, since the contents of the response is already registered in the storage unit 14, the contents of the second transmitted response will not be registered. This is due to the fact that, for example, when the control unit 11 has executed the processing operations shown in FIGS. 6A to 6D again, the process will advance to "YES" in the conditional branch at S802 in the type determination request processing. That is, in a case in which the reception history of the information of the ink cartridge 5, which is a consumable mounted on the consumable mount unit 16, is already stored in the storage unit 14, the control unit 11 will not allow the storage unit 14 to store information even if the information has been newly received via the communication unit 12. As a result, the control unit 11 will be able to store the service-related information appropriately in the storage unit 14.

As described above, according to this embodiment, if the state of the communication unit 12, which is capable of communicating with the management server 2 as an external apparatus, shifts from a communication disabled state to a communication enabled state with the management server 2, the necessity of issuing an information request will be determined based on the reception history of the service-related information. More specifically, if the communication unit 12 shifts to a communication enabled state with the management server 2 upon returning from a powered off state or the like, the type determination request processing (S613, FIG. 8) will be executed in the activation processing (FIG. 6A) or the like. During this processing, whether the cartridge type determination command is to be transmitted will be determined (S802) in accordance with the presence/ absence of the reception history of the automatic delivery applicability information, as an example of the service-related information, of the cartridge mounted on the consumable mount unit 16. Hence, the printing apparatus 1 can reliably receive the service-related information from the management server 2.

That is, this embodiment has described the printing apparatus 1 which inquires the management server 2 of the service-related information and stores the response result. According to this embodiment, even if the communication with the management server 2 is temporarily disabled, it will be possible for the printing apparatus 1 to reliably receive the service-related information from the management server by making an inquiry when the communication is enabled again.

6. Other Embodiments

Although an ink cartridge has been exemplified as a consumable in the above-described embodiment, other modes can also be employed. For example, in a case in which the printing apparatus 1 is an electrophotographic printer, the consumable may be a toner. That is, the consumable may be a printing material other than an ink cartridge. Alternatively, it may be a consumable other than a printing material.

In addition, the processing of the printing apparatus 1 shown in FIGS. 6A to 8 according to the above-described embodiment may be executable by updating a control program of a printing apparatus that includes the communication unit 12 and the consumable mount unit 16. For example, when a contract has been signed with a subscriber, the service provider may update the control program of the printing apparatus belonging to the subscriber or the printing apparatus loaned on a lease to the subscriber. This may cause the consumables management system SY to be constructed, and allow the consumable automatic delivery service to be operated.

Furthermore, although the printing apparatus 1 includes the control unit 11 and the communication unit 12 in the above-described embodiment, other modes can also be employed. For example, a communication apparatus that includes the communication unit 12 and a control unit which can execute the processing operations shown in FIGS. 6A to 8 can be connected to a printing apparatus that includes the consumable mount unit 16 to allow the printing apparatus to execute the above-described processing operations. In this case, the service provider may construct the consumables management system SY and operate the consumable automatic delivery service by connecting the communication apparatus to the printing apparatus belonging to the subscriber who has signed the contract or the printing apparatus loaned on a lease to the subscriber.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-040694, filed Mar. 12, 2021, which is hereby incorporated by reference herein in its entirety.

What is claimed is:

1. A printing apparatus comprising:
   a mount unit configured to be able to mount a consumable;
   a communication unit configured to be able to communicate with a server system configured to provide a predetermined service;
   a request unit configured to request, to the server system via the communication unit, service-related information related to the consumable mounted on the mount unit;
   a reception unit configured to receive, via the communication unit, the service-related information transmitted from the server system with respect to the request by the request unit; and
   a determination unit configured to determine, in a case in which a state of the communication unit has shifted from a first state in which communication with the server system is disabled to a second state in which communication with the server system is enabled, whether a request for the service-related information by the request unit is required, based on a reception history of the service-related information of the reception unit.

2. The apparatus according to claim 1, further comprising:
   a storage unit configured to store the reception history,
   wherein the determination unit determines whether the request for the service-related information by the request unit is required, based on the reception history stored in the storage unit.

3. The apparatus according to claim 2, wherein in a case in which the state of the communication unit has shifted from the first state to the second state, the determination unit will determine to cause the request unit to execute the request if the reception history of the consumable mounted on the mount unit is not stored in the storage unit.

4. The apparatus according to claim 2, wherein the storage unit can further store the service-related information received by the reception unit,
   the printing apparatus further comprises a storage control unit configured to cause the storage unit to store the service-related information received by the reception unit, and in a case in which the reception history of the consumable mounted on the mount unit is already stored in the storage unit, the storage control unit will not allow the storage unit to store the service-related information even if the service-related information of the consumable mounted on the mount unit has been received by the reception unit.

5. The apparatus according to claim 1, further comprising:
a reading unit configured to read information related to the consumable mounted on the mount unit,
wherein the request unit requests the service-related information by transmitting the information related to the consumable read by the reading unit.

6. The apparatus according to claim 5, wherein the request unit transmits the information related to the consumable mounted on the mount unit to the server system, and
the reception unit receives the service-related information from the server system if the information related to the consumable is registered in the server system in association with the printing apparatus.

7. The apparatus according to claim 1, wherein the communication unit shifts from the first state to the second state if the printing apparatus is powered on.

8. The apparatus according to claim 1, wherein the service-related information is information indicating whether the consumable mounted on the mount unit is supported by the predetermined service.

9. The apparatus according to claim 8, wherein the predetermined service is a service related to delivering the consumable mounted on the printing apparatus.

10. The apparatus according to claim 1, wherein the consumable is a printing material configured to print an image on a print medium.

11. A method of controlling a printing apparatus,
the printing apparatus including:
a mount unit configured to be able to mount a consumable; and
a communication unit configured to be able to communicate with a server system configured to provide a predetermined service,
the method comprising:
requesting, to the server system via the communication unit, service-related information related to the consumable mounted on the mount unit;
receiving, via the communication unit, the service-related information transmitted from the server system with respect to the request by the request unit; and
determining, in a case in which a state of the communication unit has shifted from a first state in which communication with the server system is disabled to a second state in which communication with the server system is enabled, whether a request for the service-related information by the requesting is required, based on a reception history of the service-related information of the receiving.

12. The method according to claim 11, wherein the printing apparatus further includes a storage unit configured to store the reception history,
wherein the determining determines whether the request for the service-related information by the requesting is required, based on the reception history stored in the storage unit.

13. The method according to claim 12, wherein in a case in which the state of the communication unit has shifted from the first state to the second state, the determining will determine to execute the request by the requesting if the reception history of the consumable mounted on the mount unit is not stored in the storage unit.

14. The method according to claim 12, wherein the storage unit can further store the service-related information received by the receiving,
the method further comprises controlling the storage unit, the controlling causing the storage unit to store the service-related information received by the receiving, and
in a case in which the reception history of the consumable mounted on the mount unit is already stored in the storage unit, the controlling will not allow the storage unit to store the service-related information even if the service-related information of the consumable mounted on the mount unit has been received by the receiving.

15. The method according to claim 11, further comprising:
reading information related to the consumable mounted on the mount unit,
wherein the requesting requests the service-related information by transmitting the information related to the consumable read by the reading.

16. The method according to claim 15, wherein the requesting transmits the information related to the consumable mounted on the mount unit to the server system, and
the receiving receives the service-related information from the server system if the information related to the consumable is registered in the server system in association with the printing apparatus.

17. The method according to claim 11, wherein the communication unit shifts from the first state to the second state if the printing apparatus is powered on.

18. The method according to claim 11, wherein the service-related information is information indicating whether the consumable mounted on the mount unit is supported by the predetermined service.

19. The method according to claim 18, wherein the predetermined service is a service related to delivering the consumable mounted on the printing apparatus.

20. The method according to claim 11, wherein the consumable is a printing material configured to print an image on a print medium.

* * * * *